US005423244A

United States Patent [19]

Walchhutter

[11] Patent Number: 5,423,244

[45] Date of Patent: Jun. 13, 1995

[54] HYDRAULIC CIRCUIT FOR AN APPARATUS FOR GENERATING PRESSURE AND APPARATUS FOR GENERATING PRESSURE USING SAID HYDRAULIC CIRCUIT

[75] Inventor: Ulrico Walchhutter, Milan, Italy

[73] Assignee: S.I.T.I. Societa Impianti Termoelettrici Industriali S.p.A.

[21] Appl. No.: 39,275

[22] PCT Filed: Sep. 24, 1991

[86] PCT No.: PCT/EP91/01816

§ 371 Date: Apr. 9, 1993

§ 102(e) Date: Apr. 9, 1993

[87] PCT Pub. No.: WO92/09424

PCT Pub. Date: Jun. 11, 1992

[30] Foreign Application Priority Data

Nov. 21, 1990 [IT] Italy .................................. 22129/90

[51] Int. Cl.[6] ........................ F15B 11/08; F16D 31/02

[52] U.S. Cl. ........................................ 91/461; 60/494; 100/53

[58] Field of Search ................. 91/461, 465, 444, 448, 91/446; 60/421, 494; 100/48, 53, 269 R

[56] References Cited

U.S. PATENT DOCUMENTS

| | | | |
|---|---|---|---|
| 3,016,005 | 1/1962 | Tomka et al. | 100/48 |
| 3,608,435 | 9/1971 | Conabee et al. . | |
| 4,356,763 | 11/1982 | Hagstrom | 100/48 |
| 4,524,582 | 6/1985 | Lucas et al. | 60/421 |
| 4,794,842 | 1/1989 | Eiden | 91/461 X |
| 4,953,458 | 9/1990 | Day | 100/269 R |
| 4,955,283 | 9/1990 | Hidaka et al. | 91/461 X |
| 5,081,902 | 1/1992 | Rausch | 91/461 X |
| 5,140,895 | 8/1992 | Imanishi | 100/269 R |

FOREIGN PATENT DOCUMENTS

| | | |
|---|---|---|
| 0116024 | 8/1984 | European Pat. Off. . |
| 154900 | 8/1985 | Japan . |
| 8911969 | 12/1989 | WIPO . |

*Primary Examiner*—Edward K. Look
*Assistant Examiner*—Hoang Nguyen
*Attorney, Agent, or Firm*—Wolf, Greenfield & Sacks

[57] ABSTRACT

The present invention relates to a hydraulic circuit and to an apparatus for generating pressure which use a positive-displacement pump provided with a flywheel, one-way valve for discharging the delivery of the pump into a tank, a pilot line for a first valve, delay valve for delaying the opening of the first valve, and second valve for actuating the opening of the first valve by closing the pilot line and connecting the delay valve to the tank and for actuating the closure of the first valve, connecting the pilot line to the delay valve.

11 Claims, 1 Drawing Sheet

Figure 1:
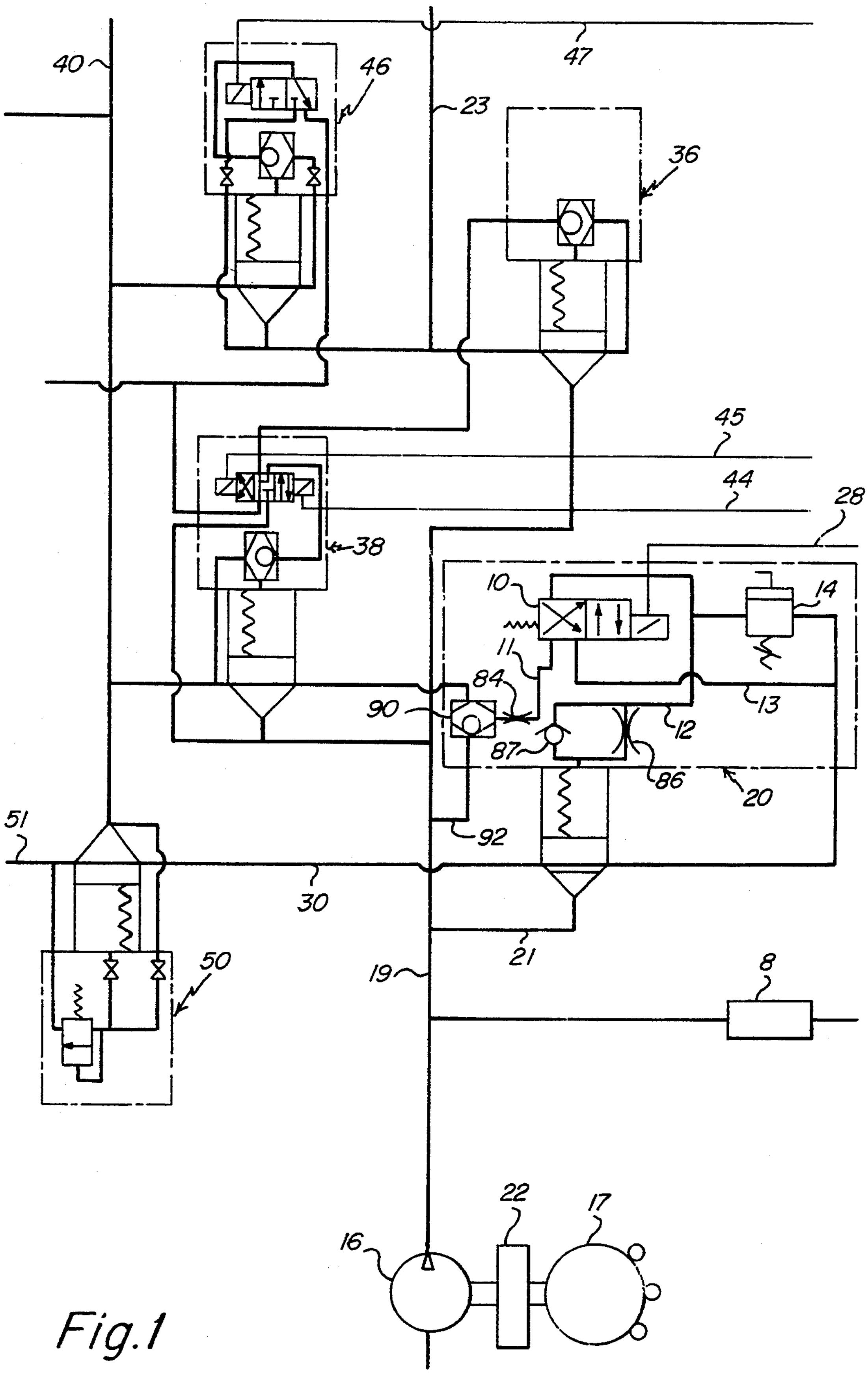

HYDRAULIC CIRCUIT FOR AN APPARATUS FOR GENERATING PRESSURE AND APPARATUS FOR GENERATING PRESSURE USING SAID HYDRAULIC CIRCUIT

The present invention relates to a hydraulic circuit for an apparatus for generating pressure and to an apparatus for generating pressure which uses said hydraulic circuit.

In particular the field of the present invention is the same one described in the patent application PCT No. WO 89/11969 and in the Italian patent applications No. 19202 A/89 and 19203 A/89, and hereinafter reference will be made only to the patent application PCT No. WO 89/11969 for the sake of simplicity, reference to the two corresponding Italian applications being also assumed thereby. More in particular, the field of the present invention is that of hydraulic circuits and of pressing devices which use an open hydraulic circuit, a tank and a pressing chamber. The pressing chamber generally directly actuates the movement of a hydraulic piston. The hydraulic circuit comprises a positive-displacement pump for directly performing the final pressing, which has a flywheel for storing kinetic energy and can pump its flow directly into the pressing chamber by means of one-way valve means which are open toward the pressing chamber. The hydraulic circuit furthermore comprises first direction control valve means for discharging into a tank the flow of the pump, so that the closure of the first valve means can directly generate the pressure and so that the flywheel accumulates and yields kinetic energy respectively during the opening and the closure of the first valve means. The hydraulic circuit finally comprises a pilot line for the first valve means and delay valve means for delaying the opening of the first valve means. In particular, the delay valve means are generally hydraulically connected to the poppet of the first valve means and comprise, for example, throttling valve means which are connected in parallel to one-way valve means which are closed toward the poppet of the first valve means.

The field of the apparatus for generating pressure according to the invention furthermore preferably comprises: an opening of a wall of the pressing chamber and a valve for quick filling and emptying arranged at said opening. A port of the valve is contained in a tank.

The above is in summary the main field of industrial utilization of the invention, but said field does not constitute a limitation of the scope thereof, since the apparatus and the circuit according to the invention, in particular as described and claimed hereinafter, can be advantageously used in any other equivalent field in which pressing operations are performed.

An apparatus and a circuit as described above are known from the patent application PCT No. WO 89/11969 and allow to achieve a very high energy saving, together with a high speed, high pressing force, oil overheating control, reduction in the number of components, high precision in the setting of speeds, pressures and movements, as well as high reliability and automatic control of operation, as indicated in detail in the application WO 89/11969.

The aim of the present invention is to achieve all of the above described objects and to additionally achieve a further energy saving comprised between 30% and 50% of the consumption of the apparatus described in application WO 89/11969.

A further object of the invention is to increase the precision of the actuation of the pressing, thereby obtaining both a better processing and an increase in the overall speed and thus in the maximum number of overall pressing cycles in the unit time.

A further object of the invention is to reduce by up to 10 times the frequency of charging of the auxiliary equipment accumulator, in particular when the machine is on but idle.

It has been observed in practice that the invention achieves the intended aim and all of the objects with a hydraulic circuit which is characterized in that said first valve means comprise second remotely controlled direction control valve means which are arranged so as to actuate the opening of said first valve means, closing said pilot line and connecting said delay valve means to said tank, and so as to actuate the closure of said first valve means, connecting said pilot line to said delay valve means.

The invention thus described allows to achieve the intended aim and all of the intended objects; in particular, the basic consumption between one pressing stroke and the next is very small, since the residual pressure is reduced from approximately 20 bar, according to the application PCT No. WO 89/11969, to approximately 5 bar, according to the invention. This entails a very important energy saving; for example, with a 2500-ton press, a 900-liter per minute pump and a 75-kilowatt motor, one obtains, by means of the present invention, an energy saving of 27 kilowatts in all the time intervals between one pressing stroke and the next.

Preferably, the line which connects the delay valve means to the second valve means is connected to the tank by means of a pressure control valve. In this manner, with very simple means, it is possible to obtain with great reliability a check against overpressures, since the pressure control valve mounted in the described arrangement opens automatically if a preset safety pressure is reached, actuating the opening of the first valve means.

Further characteristics and advantages of the invention will become apparent from the following description of a preferred but not exclusive embodiment of the hydraulic circuit and of the apparatus, illustrated only by way of non-limitative example in the accompanying drawing wherein:

FIG. 1 is a schematic view of a part of the hydraulic circuit according to the invention.

In order to fully understand the peripheral elements of the circuit and of the apparatus according to the invention, reference should be made to the figures and to the description of the application PCT No. WO 89/11969, in which the present invention integrates. In particular, FIG. 1 of the present invention corresponds to FIG. 2 of application No. WO 89/11969, and also maintains the same reference numerals for the details, except for the new elements 10–14, which have been added, according to the present invention.

With reference to FIG. 1, the hydraulic circuit according to the invention comprises a tank, not illustrated, which is connected to the line 30, 51, and a positive-displacement pump 16 which is connected to the flywheel 22 and to the electric motor 17. The positive-displacement pump 16 can pump the flow into a pressing chamber, not illustrated, which is connected to the line 23, by means of the delivery line 19 and of the one-way valve means 36 which are open toward the line 23 and the pressing chamber.

The first direction control valve means 20 can discharge the flow of the delivery line into the tank by means of the line 30, 51. In this manner, by closing the first valve means 20 it is possible to directly actuate the pressing; in particular, the flywheel 22 accumulates kinetic energy during the opening of the first valve means 20 and yields kinetic energy during closure.

The pilot line 11 of the first valve means 20 is fed by a bistable element 90, which is in turn fed by the delivery line 19 by means of the line 92 and by the line 40, which is connected to an accumulator. Therefore the pilot line 11 is at the higher pressure between the pressure of the delivery line 19 and the pressure of the accumulator connected to the line 40. The delay valve means for delaying the opening of the first valve means 20 are hydraulically connected to the poppet (not illustrated) of the first valve means 20 and comprise throttling valve means 86 and one-way valve means 87 which are connected in parallel and are opened toward the poppet of the first valve means 20.

Said first valve means 20 comprise second direction control valve means 10 which are remotely controlled by means of the line 28. In one position, said second valve means 10 actuate the opening of the first valve means 20, closing the pilot line 11 and connecting the delay valve means 87, 86 to the line 30, 51 and thus to the tank by means of the lines 12 and 13. In the other position, the second valve means 10 actuate the closure of the first valve means 20, connecting the pilot line 11 to the delay valve means 86, 87 by means of the line 12. The line 12 which connects the delay valve means 86, 87 to the second valve means 10 is connected to the tank by means of a pressure control valve 14 and by means of the line 30, 51 which is connected to the tank. When the second valve means 10 are idle, the pilot line 11 is thus closed and the poppet of the first valve means 20 is thus open, thereby allowing the charging of the flywheel 22.

When the second valve means 10 are energized by means of the actuation line 28, the pilot line 11 is connected to the delay valve means 86, 87 and the first valve means 20 are closed; in this manner the flywheel 22 yields kinetic energy to the pressurized fluid and pressing is performed.

For general operation, and in particular for the operation of the valve means 46, 50 of the actuation lines 44, 45, 47 and of the pressure sensor 8, reference must be made to the description of the patent application PCT No. WO 89/11969. Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

What is claimed is:

1. Hydraulic circuit for feeding a pressurized liquid flow to a pressing chamber of an apparatus for generating a pressure, comprising: a positive-displacement pump for directly actuating the pressing chamber having a flywheel for storing a kinetic energy; first directional control valve means for discharging the pressurized entire liquid flow of said pump into a tank, such that the pressure is generated by closing said first valve means and such that said flywheel accumulates and yields the kinetic energy respectively during an opening and the closing of said first valve means; second remotely controlled valve means adapted for effecting the opening of said first valve means by closing a connection between a pilot line of said first valve means and a poppet of said first valve means and by connecting said poppet to a tank.

2. Circuit according to claim 1 in which said second valve means is adapted for effecting the closing of said first valve means by closing a connection between said poppet and said tank and by connecting said poppet to said pilot line.

3. Circuit according to claim 1 further comprising a delay valve means arranged between said second valve means and said poppet.

4. Circuit according to claim 3 wherein said delay valve means comprises throttling valve means arranged in parallel with check valve means.

5. Circuit according to claim 4 wherein said check valve means is opened towards said poppet; and said second valve means is a directional control valve.

6. Circuit according to claim 1 wherein said connection between said pilot line and said poppet comprises a pressure control valve connected to a tank.

7. Circuit according to claim 1 in which said pilot line is coupled to an output of a bistable valve.

8. The hydraulic pressing apparatus of claim 1, wherein the apparatus exerts pressure on elements to be processed by means of a pressing chamber.

9. Apparatus according to claim 1, further comprising a check valve means having an input coupled to an output of a delivery line, an output coupled to the pressing chamber, and which opens towards said pressing chamber.

10. Apparatus according to claim 1 operating with an open hydraulic circuit.

11. Apparatus according to claim 1 in which said pump directly actuates the final pressing.

* * * * *